(12) United States Patent
Lloyd et al.

(10) Patent No.: US 9,904,260 B2
(45) Date of Patent: Feb. 27, 2018

(54) SYSTEMS AND METHODS FOR ADVANCED CONFIRMATION OF CONTROL OPERATIONS

(71) Applicant: SCHNEIDER ELECTRIC USA INC., Palatine, IL (US)

(72) Inventors: Chad Andrew Lloyd, Old Hickory, TN (US); Piotr Boleslaw Przydatek, Victoria (CA); Anthony Johnson, Murfreesboro, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 600 days.

(21) Appl. No.: 14/498,182

(22) Filed: Sep. 26, 2014

(65) Prior Publication Data
US 2016/0091875 A1 Mar. 31, 2016

(51) Int. Cl.
*G05B 15/02* (2006.01)
*G05B 23/02* (2006.01)
*G05B 9/02* (2006.01)
*G05B 19/042* (2006.01)

(52) U.S. Cl.
CPC .............. *G05B 15/02* (2013.01); *G05B 9/02* (2013.01); *G05B 19/0428* (2013.01); *G05B 23/0213* (2013.01)

(58) Field of Classification Search
CPC . G05B 15/02; G05B 19/0428; G05B 23/0213
USPC .......................................................... 700/79
See application file for complete search history.

(56) References Cited

U.S. PATENT DOCUMENTS

| 5,625,266 A * | 4/1997 | Stark ................. G05B 19/0428 187/316 |
| 2005/0081098 A1* | 4/2005 | Demaray .............. G06F 11/006 714/15 |
| 2005/0134284 A1* | 6/2005 | Hoff ....................... E02F 9/267 324/511 |
| 2006/0044133 A1* | 3/2006 | Lou .......................... F24C 7/08 340/531 |
| 2010/0070736 A1* | 3/2010 | Kimura ............ G11B 20/00086 711/216 |

(Continued)

OTHER PUBLICATIONS

Extended European Search Report from corresponding European Application No. 15186799.1 dated Mar. 3, 2016.

*Primary Examiner* — Ryan D. Coyer
(74) *Attorney, Agent, or Firm* — Lando & Anastasi, LLP

(57) ABSTRACT

Verification systems are provided for verification of proper execution of control commands on remote devices. In some embodiments, the verification systems can include video cameras, audio sensors, thermal detectors, etc., to provide secondary sources of information by which to verify primary reports on a state of a remote device. Each device can be associated with a device profile defining operating characteristics of the remote device in various states. In some examples, device properties can also be defined based on a current state of the device and a received control command. In some examples, the device profiles are models of expected device properties that can used to verify proper execution of control commands. In some embodiments, detection of state mismatch can trigger a variety of actions by the system to mediate the mismatched state according to a variety of control rules.

22 Claims, 4 Drawing Sheets

(56) References Cited

U.S. PATENT DOCUMENTS

| | | | |
|---|---|---|---|
| 2013/0063848 A1* | 3/2013 | Thorpe | H02H 3/02 361/63 |
| 2014/0156032 A1* | 6/2014 | Jenkins | G05B 9/02 700/78 |
| 2014/0340526 A1* | 11/2014 | Miura | H04N 17/002 348/175 |

* cited by examiner

SYSTEMS AND METHODS FOR ADVANCED CONFIRMATION OF CONTROL OPERATIONS

BACKGROUND

Technical Field

The technical field of this disclosure relates generally to remote management and control systems and, more particularly, to verifying control operations executed by the management systems on remote devices.

Background Discussion

SCADA ("supervisory control and data acquisition") systems operate with coded signals over communication channels to provide for management and control of remote equipment. Typically SCADA systems and other controlling applications, have the capability of executing control requests to remote devices, such as a circuit breaker, environmental control systems, lighting systems, energy devices, etc. SCADA systems can be implemented to control power delivery, operation of equipment, and remotely manage large or small devices. In some implementations, a SCADA system can control opening or closing a breaker at a remote electrical substation to manage power delivery. A user interacting with the SCADA systems typically receives confirmation of a successful control attempt (e.g., close or open the circuit breaker) by means of a message sent across a communication network generated by the remote device.

In some situations (e.g., critical systems and/or systems having safety considerations), it is desirable or required to have a secondary confirmation of a successful control event. For example, an engineer in a central control room can issue an open-breaker command to a circuit breaker at a remote substation. Before concluding that the circuit breaker is in fact open, the engineer may have someone visually inspect the circuit breaker (by driving to the remote substation).

SUMMARY

It is realized that various conventional approaches for managing remote systems can be improved upon by incorporating verification models for validating a successful management operation executed on one or more remote devices. According to aspects and embodiments, verification systems can be implemented to enhance conventional SCADA systems and provide advanced confirmation of control events. In one example, the verification system includes video capture devices configured to provide video streams of the physical hardware being controlled. In one embodiment, the verification system is responsive to control events or control commands communicated to remote devices (e.g., by a SCADA system or a building management system ("BMS")). In one example, the system identifies a control command executed on a remote device (e.g., open circuit breaker). Responsive to the control command, the system triggers video capture of the device being controlled (e.g., the circuit breaker, or the load (such as the motor the circuit breaker is protecting). In one embodiment, video analysis by the system confirms a successful execution of the control command (e.g., the circuit breaker is in an open position). In various embodiments, verification devices are provided by the system (e.g., video cameras, audio capture devices, load monitors, motion sensors, infra-red detectors, thermal detectors, environmental monitors) and are used in addition to typical monitoring sensors and/or other acknowledgements provided by a remote management system (e.g. a SCADA system).

According to one embodiment, verification models for validating successful management operations on one or more remote devices are used to ensure security of the remote devices. It is known that critical infrastructure systems (e.g., water management, power management, traffic control systems, etc.) could be the subject of hacking and/or cyber-attacks to highly detrimental effect. Many resources have been devoted to making civil infrastructure more secure and less vulnerable to attack. According to various embodiments, verification modeling can be used to automatically verify remote commands and their respective effect on the devices being managed. In one example, a verification model is created to establish a model of expected behavior of a remote device and any associated state of the device (e.g., on, off, powering down, cooling down, shutting down, slowing, starting up, etc.). For example, a power turbine controlled by a management system can have a verification profile that includes an audio profile, power consumption/generation profile, heat signature, video profile, etc. Each portion of the profiled information can be used separately to verify that a remote control operation has changed the remote device to an expected state. Further, each portion of the profiled information can be used in various combinations to validate information on the remote device. In some embodiments, such validation ensures that hacking, for example, of monitoring sensors on the system, is detected. Further, false information and/or errors in acknowledgements of control operations are readily detected based on the verification profile. In some embodiments, the combinations of profile information can be selected by the system dynamically so that the only way an erroneous state can be concealed is by compromising all of the verification devices and generating a valid confirmation profile of the dynamically selected profile elements.

According to one aspect a system for verification of management operations is provided. The system comprises at least one processor operatively connected to a memory, the at least one processor configured to manage a plurality of system components, an event component configured to identify a control command for execution on a managed device, a monitoring component configured to capture monitor information associated with the managed device responsive to identification of the control command, a profile component configured to determine an expected state of a managed device based on the identified control command, and a verification component configured to verify a current state of the managed device matches the expected state based on the monitor information.

According to one embodiment, the verification component is further configured to verify the current state of the managed device reported by the control system. According to one embodiment, the profile component is further configured to define expected states for the managed device associated with a plurality of operating states and a plurality of transitions between the operating states. According to one embodiment, the verification component is further configured to evaluate the current state of the managed device to determine the managed device's characteristics match the expected state based on the control command and a previous operating state of the managed device. According to one embodiment, the verification component is further configured to execute actions on the managed device responsive to evaluation of the current state. According to one embodiment, the actions executed by the verification component include at least one of re-executing the control command, powering down the managed device, powering down an upstream device, and generating an alarm.

According to one embodiment, the monitoring component is configured to receive and process video data on the managed device; and communicate the processed video data to the verification component.

According to one embodiment, the system further comprises a behavior component configured to: track device properties of the managed device under operation; and generate a device profile for the managed device. According to one embodiment, the behavior component is further configured to generate the device profile and device properties for a plurality of operating states of the managed device. According to one embodiment, the behavior component is further configured to generate the device profile and device properties by updating an existing device profile and existing device characteristics.

According to one aspect, a method for verification of management operations is provided. The method comprises identifying, by a computer system, a control command for execution on a managed device, accessing, by the computer system, monitor information associated with the managed device responsive to identification of the control command, determining, by the computer system, an expected state of a managed device based on the identified control command, and verifying, by the computer system, a current state of the managed device matches the expected state based on the monitor information.

According to one embodiment, the act of verifying includes verifying the current state of the managed device reported by the control system. According to one embodiment, the method further comprises defining, by the computer system, expected states for the managed device associated with a plurality of operating states and a plurality of transitions between the operating states.

According to one embodiment, the act of verifying includes verifying the current state of the managed device to determine the managed device's characteristics match the expected state based on the control command and a previous operating state of the managed device. According to one embodiment, the method further comprises automatically executing, by the computer system, actions on the managed device responsive to evaluation of the current state. According to one embodiment, the act of automatically executing includes at least one of re-executing the control command, powering down the managed device, powering down an upstream device, and generating an alarm.

According to one embodiment, the method further comprises processing, by the computer system, video data on the managed device, and communicating the processed video data to the verification component. According to one embodiment, the method further comprises tracking, by the computer system, device properties of the managed device under operation, and generating, by the computer system, a device profile for the managed device. According to one embodiment, generating the device profile includes generating the device profile and device properties for a plurality of operating states of the managed device. According to one embodiment, generating the device profile for the managed device includes updating an existing device profile and device characteristics.

Other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment or example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
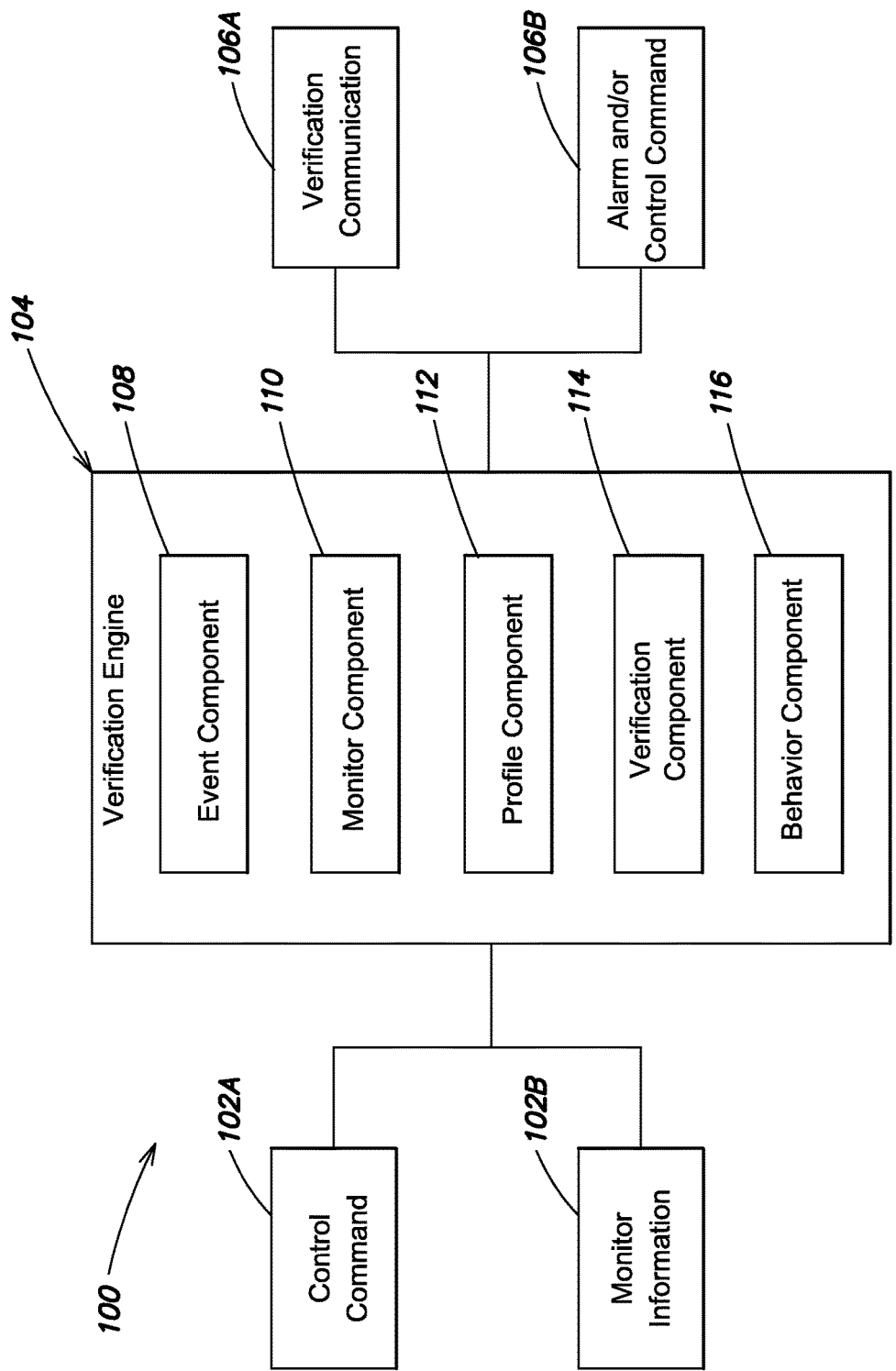
FIG. 1 is a block diagram of an example verification system, according to one embodiment.

According to one aspect, conventional control systems (e.g., SCADA and/or BMS systems) for remotely controlling devices are augmented to include verification of proper execution of control commands. According to one embodiment, verification systems (including, for example, video, audio, and motion monitors) can be used to verify control commands are properly executed on remote devices in addition to any acknowledgements that are typically received. In various embodiments, a verification system or sub-system is configured to monitor information in addition to the control system's sensors and/or acknowledgement functions. In some examples, the verification system provides a secondary layer of monitor information which can be used to verify any information reported by and/or to the control system.

According to some embodiments, the verification system can be implemented to provide secure validation on the state of managed devices. Secure validation provides real world validation (e.g., video streams) of acknowledgement message and/or sensor data being reporting by control systems, increasing overall security and limiting safety issues. In further embodiments, safety validation of the state of large and/or dangerous machinery can save lives. The verification system can also be configured to execute additional control operations on remotely managed devices to ensure safety based on a determined actual state of the managed device. In yet other examples, the verification system can also be configured to execute control operations on upstream devices to effect a control command that was not properly executed on a target device.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Verification System

Some embodiments implement a verification system that can be separate from or integrated into one or more control systems (e.g., SCADA and/or BMS systems). The verification system can be configured to capture and analyze monitor information to verify an expected state of a managed device (e.g., based on a control command) matches an actual state of the managed device. In one embodiment, video monitoring of the managed device (e.g., a power circuit) is analyzed by the verification system to ensure that a control command to open the circuit (e.g., stop the flow of electricity) is executed properly. In one example, video analysis can confirm that the circuit is open. It is realized that while primary monitors (e.g., power flow sensors) within the control system report or provide acknowledgement of the execution of a command operations, these acknowledgments are a point of attack from a security perspective. Additionally, any errors (e.g., false acknowledgement) can jeopardize the managed devices and can jeopardize personnel safety. Secondary confirmation, for example, based on observable information can provide the necessary confidence in a managed device state to allow an engineer to know with certainty that the control command was properly executed.

FIG. 1 illustrates one embodiment of a verification system 100. The verification system 100 can be configured to integrate with existing SCADA and/or BMS systems to provide verification of managed device state. For example, SCADA and/or BMS systems exist that facilitate management of an environment within a building, rooms within the building, and/or remote locations. In some examples, BMS systems enable remote control over machinery in the location, can control heating, ventilation, and air conditioning ("HVAC") systems, and can even control power delivery within a location. The verification system captures natural or real world information in addition to conventional sensor and data provided by the BMS system, to verify any reporting by the BMS system. In one example, the verification system evaluates real world information captured on a managed device against a state profile for the managed device. For example, the verification system can detect a motor is slowing down after a control command to de-activate based on analyzed video of the motor.

Elements of the system 100 can be provided using a specially configured computing system such as the computer system 400 and/or 402 described with reference to FIG. 4. In one example, the system 100 can include a verification engine 104 configured to execute the functions, processes, and/or operations discussed herein. In one example, the verification engine 104 can be executed on the computer system (e.g., 400 and/or 402) to provide the functions and operations discussed.

In other embodiments, the verification system 100 and/or engine 104 can include additional components executed on the computer system to perform specific operations. For example, the system and/or engine can instantiate specific components configured to execute various operations on the system. In some implementations, the system 100 and/or engine 104 can be configured to communicate with existing control systems (e.g., SCADA or BMS systems), to trigger alarms, or to execute additional control commands to effect a failed command or ensure safety.

As shown in FIG. 1, the verification system 100 and/or verification engine 104 receives input (e.g., 102A—control command) from control systems (e.g., SCADA and/or BMS systems) and identifies control commands being issued from the control systems to managed devices. The managed devices can include any powered device in a managed building. In some examples, the managed devices can include environmental control devices, power delivery devices, civil infrastructure devices (e.g., water treatment devices, water flow control devices, traffic devices, power generation devices, power distribution devices, etc.), among other options. In some embodiments, the system 100 and/or engine 104 is configured to monitor communication between a control system and managed devices to identify control commands that affect the state of a managed device. Responsive to identification of a control command (e.g., power on, power off, etc.), the system and/or engine can analyze monitor information (e.g., 102B) to determine that the actual state of the managed device matches the state expected after executing the control command.

If the expected and actual states match, the system and/or engine can communicate a verification message (e.g., 106A). Otherwise the system and/or engine can trigger alarms and/or trigger new control commands (e.g., 106B) to achieve the expected state. In one example, if a power off command has been reported as successful by the control system and the expected state of the device does not match a powered off profile, the system and/or engine can generate alarms to notify operators of the failed command and/or invalid state information, and in further examples, issue power off commands to upstream power devices (e.g., devices responsible for delivering power to the managed device). Where the expected state does not match an actual state, the results can be catastrophic—machinery can be destroyed, fatalities may result. Thus, secondary verification can be vital in critical systems and/or public heath service systems. It is realized that where states do not match, the sensor may have failed, but more troubling is the potential that the sensor has been compromised to report invalid information. The verification system 100 and/or engine can mitigate such risk and increase safety over conventional approaches by analyzing natural information obtained from device monitors (e.g., video cameras, microphones, heat detectors, etc.).

In further embodiments, the system 100 and/or engine 104 can include specialized components for identifying control commands (e.g., 102A), analyzing monitor information (e.g., 102B) and for communicating verification messages and/or further control commands (e.g., 106B). In one embodiment, the system and/or engine includes an event component 108 configured to analyze communications between control systems and managed devices. The event component is configured to identify control commands or control events within the communications that affect a state of a managed device. Once a control command is detected, for example, by the event component 108, monitor information for the managed device is analyzed to determine and actual state of the managed device responsive to the communicated control command. In some embodiments, the event component 108 can be configured to indentify a variety of control commands in a variety of formats (e.g., LonWorks, BACnet, KNX, Modbus, M-Bus, and OPC, among other communication format options). The event component 108 can be configured to identify the device being managed, valid operating states for the device, and/or valid control commands that can be executed. In some embodiments, the event component is configured to identify the control command and the effect the control command will have on the managed device upon execution. In some examples, the verification system 100 and/or engine 104 can query the control system for valid control commands and information on effect. In other examples, the verification system can include data on managed devices, valid operating states, valid control commands, and resulting state information.

According to one embodiment, a monitor component 110 can capture information from monitoring devices associated with the device being managed by the control system. The captured information can then be compared to the expected state information, for example, determined by the event component 108. Monitor information can be obtained from a variety of sources including, for example, video surveillance, audio recordings, motion detectors, thermal sensors, power sensors, environmental sensors, etc. The information captured from the monitoring devices can be used by the system to verify that a control command was in fact properly executed.

In some embodiments, the system 100 and/or engine 104 can include a verification component 114 configured to determine that the monitored state of a managed device matches the expected state of the managed device. In some embodiments, the verification component 114 can be configured to use all the available monitor information to establish the expected state matches the actual state of the managed device. In other embodiments, the verification component 114 can be configured to analyze subsets of the monitored information to establish the expected state matches the actual state of the managed device. In yet other embodiments, the verification component 114 can be configured to dynamically select the subsets of monitor information used to verify. According to one embodiment, randomized selection by the verification component can be used to augment security of the verification while reducing computation burden. For example, a hacker would have no way of knowing what monitor information needs to be altered to improperly obtain verification. Thus, security can be enhanced while using subsets of the monitored information.

In further embodiments, device characteristics and device states can be captured into device profiles. The verification component 114 analyzes monitored information obtained from the monitoring component 110 to evaluate against a device profiles specifying expected device characteristics. In some embodiments, a profile component 112 can store and manage profile information on managed devices. In one example, each device and respective device state can be associated with a profile defining operating characteristics. For example, an audio portion of the profile can include volume, sound characteristics, frequency, oscillations of sound, etc., which are representative of the managed device in various states. The device profiles can include device characteristics for a variety of states and/or specific transitions between states. For example, a device under normal operating conditions can be associated with specific properties (e.g., temperature, volume, other sound characteristics, visual properties (e.g., captured video information), etc. The same device can include profile information for operating in an overloaded capacity, in a powering down state, in a powering up state, among other options. Each device can include device characteristics for transitions between respective states.

In some embodiments, a device and/or state profile can be defined for each transition between a starting state and a target state. For example, a managed device (e.g., a cooling fan) can have specific properties based on a transition from off to a normal operating state (e.g., the operating temperature, sound volume, sound characteristics, energy consumption, and speed can be specified for each of the transitions). In some embodiments, the profile information can include video information that model operating characteristics of the managed device in any number of respective states based on monitor information. Transitions from an off state to an operating state can also be associated with a state profile for the fan, as well as for the transitions to/from an operating state to an off state. Additional profiles can define device characteristics for a transition from an overloaded state to off, and can include a fast power up transition, a slow power up transition, etc. For example, cooling fans or ventilation fans can need substantial time to slow to a stop and the profile properties can reflect these characteristics. Such fans may also be operated in overloaded states for short periods of time. In some examples, start up characteristics can vary greatly from operating characteristics. Additionally, a pre-existing state of the device can also impact operating characteristics in the device profile. Each of the various states and device properties can be verified by the system.

Optionally, the system 100 and/or engine 104 can include a behavior component 116. The behavior component 116 can be configured to record the monitor information to develop device profiles and/or respective state based profile information on managed devices. According to some embodiments, the behavior component 116 can also be configured to modify existing device profiles based on a device's operating characteristics. It is realized that as machinery ages, operating characteristics can change over time. In some embodiments, the behavioral component 116 is configured to track such changes and update device profiles accordingly. According to some embodiments, the behavior component can be configured to verify any such changes to a device profile by confirming the new operating characteristics using one or more additional monitoring devices. In some examples, the system can include a tunable threshold for the number of additional monitoring devices required to update a profile.

According to one aspect, the system 100 and/or engine 104 can respond to failed verifications (i.e., actual and expected device states do not match). The system can analyze the actual state of the device and respond accordingly. For example, the verification system can reissue a control command automatically. In another example, the verification system can target upstream devices for control commands to accomplish the same or similar effect on the managed device. Further, the verification system 100 can trigger safety protocols based on actual state, especially where the control system has erroneous information.

According to one embodiment, the verification system is configured to identify with particularity, scenarios where a control command is acknowledged to a control system (i.e. success indicated) but the expected state does not match the actual state of the device. Verification failures can be the result of failed sensors, compromised systems, etc., and the verification system 100 can include rules for determining an appropriate action. According to one embodiment, the verification component 114 can include a rules engine defining a current device condition, a control command (e.g., that failed), and an action for the system to execute. In one example, the action includes re-issuing the control command to the managed device. In other examples, the actual state of the device can jeopardize safety and/or destroy the managed device itself. In such scenarios, the rules and/or rules engine can trigger additional actions, including for example, terminating power to managed device via upstream power control. Further, safety and/or property considerations can trigger alarms and additional actions based on the rules defined in the system.

In some embodiments, the optional behavior component 116 can capture information on resolution of verification failures (e.g., what steps were taken by maintenance personnel to resolve the problem) and build rules that can be validated and executed by the verification system 100 to achieve the same results.

Figure 2:
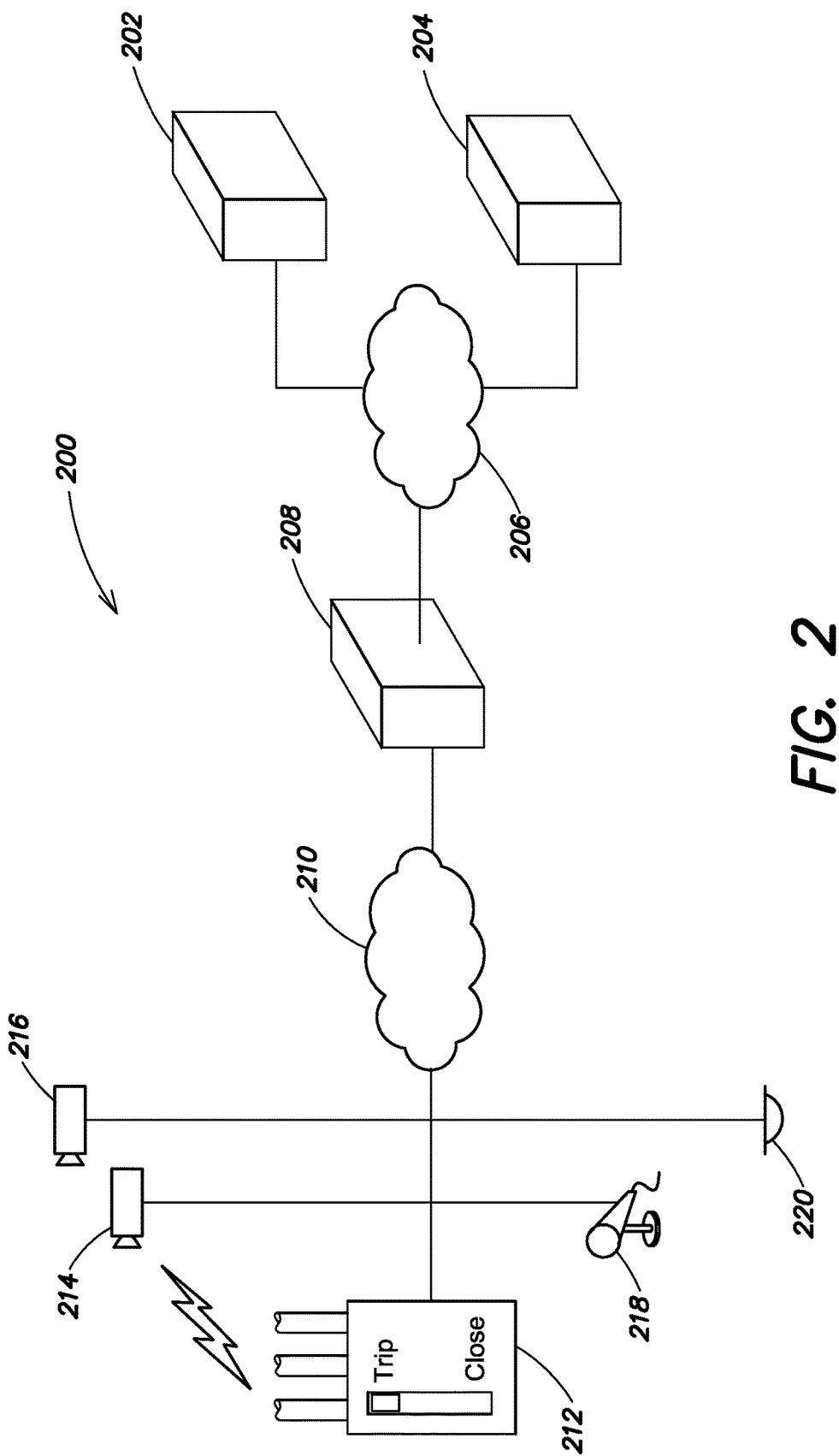
FIG. 2 is a block diagram of an example environment for a verification system, according to some embodiments.

FIG. 2 illustrates an example environment 200 for the verification system 202. According to some embodiments, the verification system 202 can be implemented separately from any control system 204. The control system is configured to manage any number of devices remotely, issuing control commands, executing operating schedules, maintenance functions, etc. In other embodiments, the verification system and control system can be implemented together, and in further embodiments, the systems can be distributed. As shown in FIG. 2, the verification system and control system 204 communicate over communication network 206 to a system local to a managed location. In one embodiment, the local system can manage a plurality of devices at the remote location. For example, the local system can collect information on the managed devices, communicate sensor information, collect and communicate information from managed devices, etc. In other embodiments, the local system can by implemented on the device being managed.

According to one embodiment, the local system 208 is configured to communicate with one or more devices to be managed over communication network 210. In one example, the managed devices include a power circuit 212. The power circuit 212 controls delivery of power. In a closed state, power flows through circuit 212. In an open state, power does not flow. In some embodiments, the power circuit can include sensors for monitoring power flow. The control system 202 can be configured to manage the states of the power circuit 212 by issuing control commands (e.g., open or close). In other examples, the power circuit can also manage power levels and distribution of the delivered power. Each power setting can represent a state of the power circuit and each state of the power circuit can be verified by the verification system 202 by analyzing monitor information against characteristics for the device and/or state in the device profile. Shown at 214, 216, 218, and 220 are example monitoring devices that can capture information on a device's operating characteristics. For example, video information can be captured by a video camera (e.g., 214) to provide visual properties on the device being managed. For example, a video feed can be analyzed to determine the position of the power circuit (e.g., open or closed). Thermal data can be captured by a thermal imager (e.g., 216), audio captured by a microphone (e.g., 218), and motion can be detected by motions sensors (e.g., 220), among other options. In other embodiments, other monitoring devices can be installed to provide additional characteristics, and managed devices can be monitored in a variety of settings. In some embodiments, the monitoring devices are implemented as a secondary information source. The secondary information source can be use to verify information communicated by primary sources of information, received from, for example, sensors in the managed devices and/or sensor that are part of the control system.

According to some embodiments, critical systems and/or civil infrastructure installations can be augmented by the verification system. For example, in a water treatment setting, fluoride detectors can be used in conjunction with introduction of fluoride into the municipal drinking water. A false reading from the detector or even a compromised reading from the detector could result in toxic levels of fluoride in the drinking water. The verification system can be configured with the characteristic properties of the devices that introduce fluoride as well as a properly functioning fluoride sensor. Based on modeling the operating characteristics (e.g., via a device profile), the verification system can automatically detect a false reading. In some examples, the verification system can automatically act to correct the state of either device. The verification system can be configured stop introduction of fluoride in response to a detected error. Further, the verification system can generate alarms for human intervention.

Figure 3:
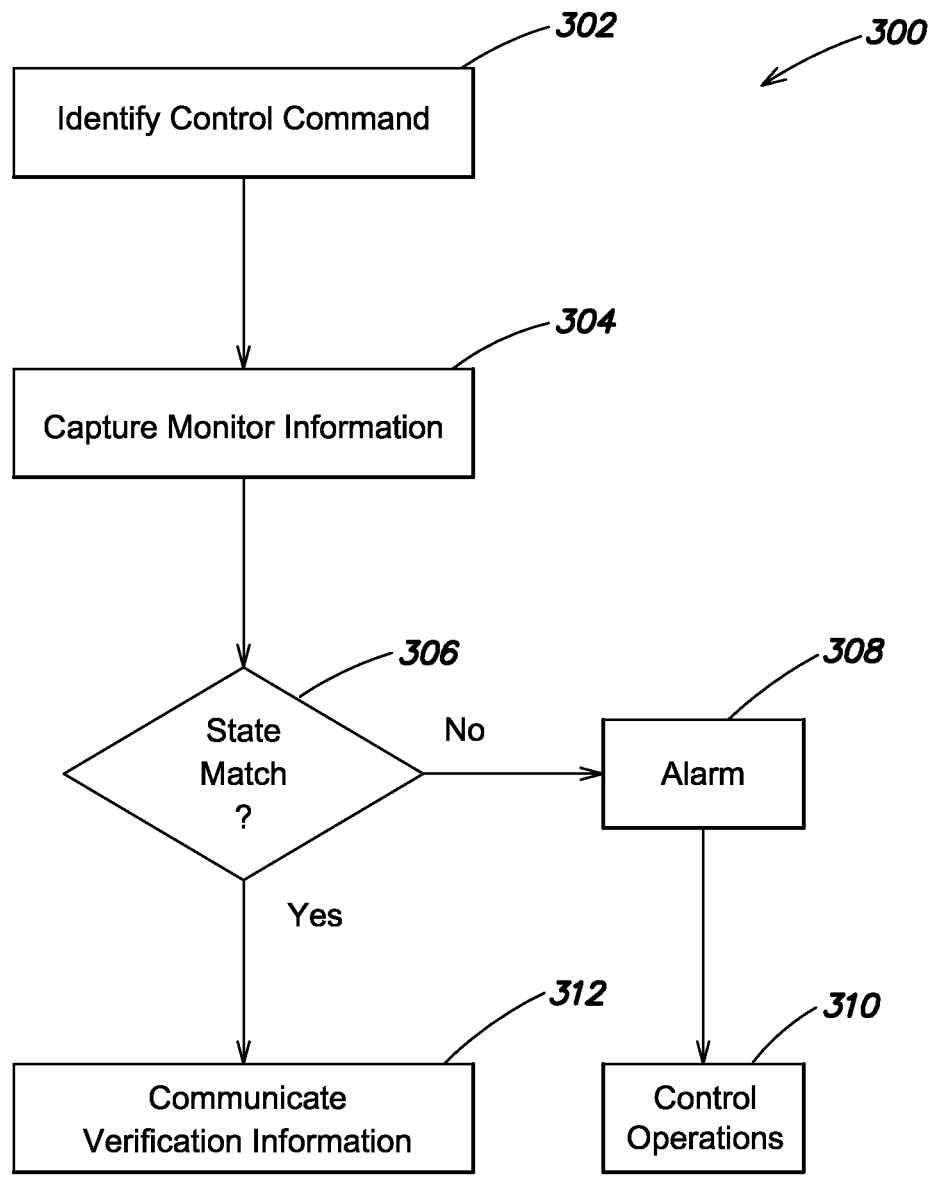
FIG. 3 is a flow diagram illustrating a process for verifying execution of a control command, according to one embodiment.

FIG. 3 illustrates an example process flow 300 for verifying execution of control commands. The process 300 begins at 302 with identification of a control command. In some embodiments, a verification system can be integral with a control system (e.g., BMS or SCADA system) and listen to internal communication to identify control commands. In other embodiments, the control system can be configured to notify the verification system of issued control commands. Responsive to identification of the control command at 302, the process continues with analysis of monitor information associated with the device that is the target of the control command at 304. For example, video data, audio data, temperature data, motion data, power load data, etc., can be accessed at 304. At 306, a determination is made on whether the expected state of the managed device matches the actual state of the device. In some examples, a device profile can be used to determine whether the expected state matches the actual state of the device. If the there is no match, 306 NO, then alarms can be generated at 308 and optionally additional control operations can be executed at 310.

In some embodiments, if the verification fails 306 NO, a plurality of processing rules can be accessed by the system to determine a responsive action to execute automatically (e.g., at 308-310). For example, the responsive action can be as simple as re-execute the original control command. In other embodiments, the action can be as drastic as stopping power to a remote location. The rules stored on the system can account for potential harm, safety, as well as the potential for the destruction of valuable machinery.

If the verification succeeds 306 YES, the process continues at 312 with communication of verification information. In some embodiments, the verification information includes the monitor information use to verify the actual state of the managed device matches the expected state of the managed device.

The process 300 is an example process flow and logic that can be executed, for example, by the verification system 100. In other embodiments, different process flows and/or processing logic can be executed by a verification system. In some example, the process logic executed can depend on the remote location and devices being managed.

According to one embodiment, the monitor information can be used by the verification system not only to verify states of managed devices, but also to take security and/or safety actions based on the actual state of the devices. In one example, the verification system can lock a remote location or prevent entry to maintenance personnel based on an actual state of a managed device. For example, arc flashes in power stations can be deadly, thus if the actual state of the device indicates the power station is still active/operational, the verification system can prevent entry. The verification system can also use the monitor information to perform additional safety verifications.

In one embodiment, the verification system can include information on required safety gear for maintenance personnel. The verifications system can evaluate video imagery of the maintenance personnel against any requirement for protective gear and any actual state of the equipment. The verification system can take positive action to ensure safety—locking rooms, powering down equipment, etc.

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communication networks.

For example, various aspects and functions including identifying control commands, analyzing monitor information, evaluating actual versus expected state, generating profiles for device characteristics, may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 4:
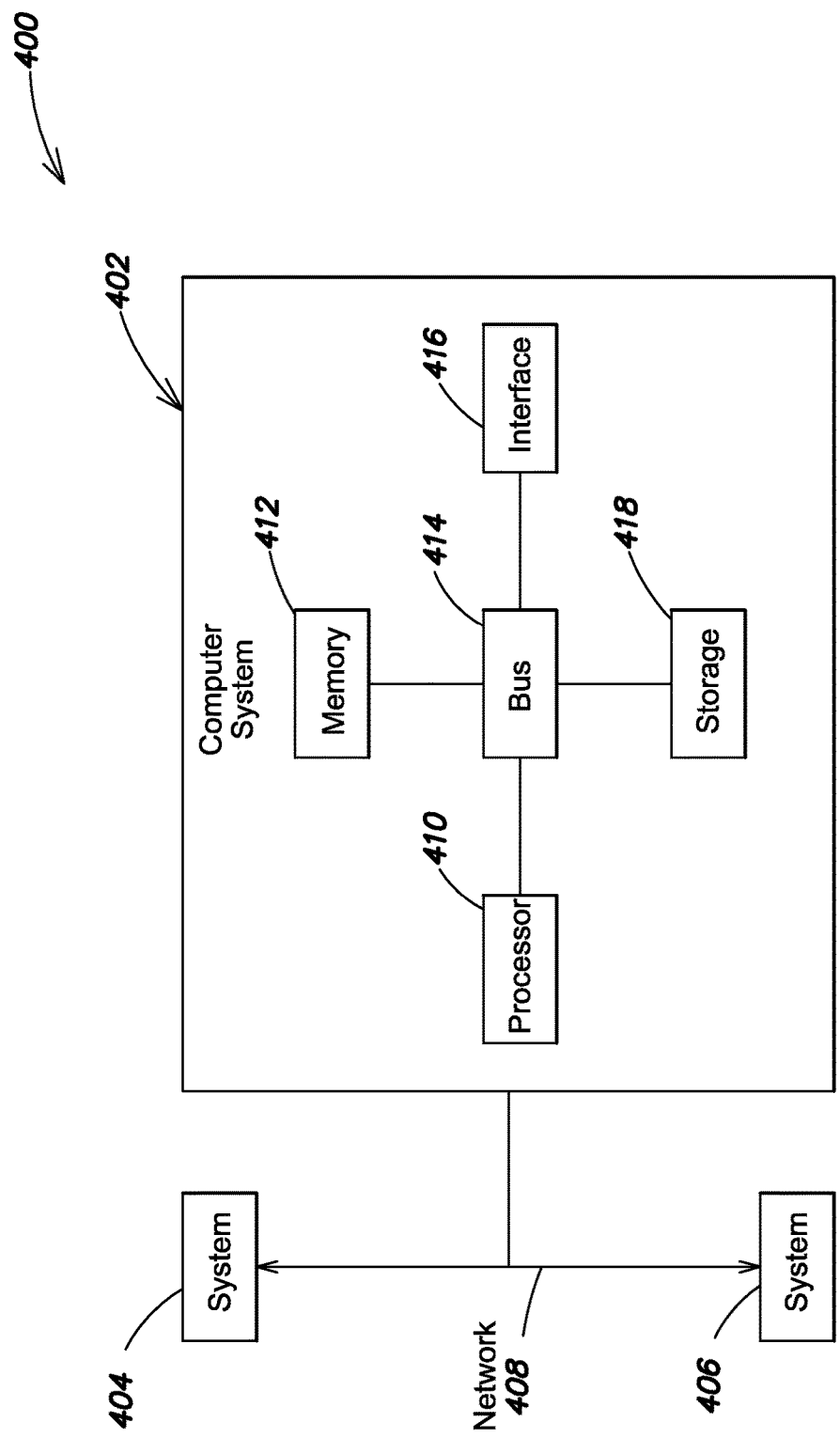
FIG. 4 a schematic diagram of an exemplary computer system that may be specially configured to perform processes and functions disclosed herein.

Referring to FIG. 4, there is illustrated a block diagram of a distributed computer system 400, in which various aspects and functions are practiced. As shown, the distributed computer system 400 includes one more computer systems that exchange information. More specifically, the distributed computer system 400 includes computer systems 402, 404 and 406. As shown, the computer systems 402, 404 and 406 are interconnected by, and may exchange data through, a communication network 408. For example, a verification system and/or a verification engine can be implemented on 402, which can communicate with a BMS system (e.g., implemented on 406), which operate together to provide for verification of control commands on managed devices, for example, as discussed herein. In other embodiments, the verification system and/or engine can be included in a BMS system or a SCADA system, and the functions performed can be implemented on 402 or distributed between 402-406.

In some embodiments, the network 408 may include any communication network through which computer systems may exchange data. To exchange data using the network 408, the computer systems 402, 404 and 406 and the network 408 may use various methods, protocols and standards, including, among others, GSM, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 402, 404 and 406 may transmit data via the network 408 using a variety of security measures including, for example, TLS, SSL, VPN, or message-based encryption (e.g., packet-level encryption). While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, a bus 414, an interface 416 and data storage 418. To implement at least some of the aspects, functions and processes disclosed herein, the processor 410 performs a series of instructions that result in manipulated data. The processor 410 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power6+ processor and an IBM mainframe chip. The processor 410 is connected to other system components, including one or more memory devices 412, by the bus 414.

The memory 412 stores programs and data during operation of the computer system 402. Thus, the memory 412 may be a relatively high performance, volatile, random access memory such as a dynamic random access memory (DRAM) or static memory (SRAM). However, the memory 412 may include any device for storing data, such as a disk drive or other non-volatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the bus 414. The bus 414 may include one or more physical busses, for example, busses between components that are integrated within the same machine, but may include any communication coupling between system elements including specialized or standard computing bus technologies such as IDE, SCSI, PCI and InfiniBand. The bus 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage 418 includes a computer readable and writeable nonvolatile, or non-transitory, data storage medium in which instructions are stored that define a program or other object that is executed by the processor 410. The data storage 418 also may include information that is recorded, on or in, the medium, and that is processed by the processor 410 during execution of the program. More specifically, the information may be stored in one or more data structures specifically configured to conserve storage space or increase data exchange performance. The data storage can include logging of counter information, tracking of compliance information, etc. Further, the data storage can include user specified time periods for first alarms, second time periods for second alarms, and total time periods for recording non-compliance.

The instructions stored in the data storage may be persistently stored as encoded signals, and the instructions may cause the processor 410 to perform any of the functions described herein. The medium may be, for example, optical disk, magnetic disk or flash memory, among other options. In operation, the processor 410 or some other controller causes data to be read from the nonvolatile recording medium into another memory, such as the memory 412, that allows for faster access to the information by the processor 410 than does the storage medium included in the data storage 418. The memory may be located in the data storage 418 or in the memory 412, however, the processor 410 manipulates the data within the memory, and then copies the data to the storage medium associated with the data storage 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having different architectures or components than that shown in FIG. 4. For instance, the computer system 402 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, 2000 (Windows ME), XP, Vista, Windows 7, 8, or RT operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Objective C, or Javascript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. For example, an administration component can render an interface in a browser to enable definition of contamination risks.

Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for verification of management operations, the system comprising:
    at least one processor operatively connected to a memory, the at least one processor configured to manage a plurality of system components;
    an event component configured to identify a control command for execution on a managed device;
    a monitoring component configured to capture monitor information associated with the managed device responsive to identification of the control command;
    a profile component configured to determine an expected state of the managed device based on the identified control command; and
    a verification component configured to verify a current state of the managed device matches the expected state based on the monitor information by performing a secondary confirmation of a successful completion of the control command by the managed device, performing the secondary confirmation including analyzing the monitor information to determine if an actual state of the managed device matches the expected state, the secondary confirmation performed in addition to receiving acknowledgement of successful completion of the control command by the managed device,
    the system configured to execute one or more control functions to mitigate undesirable effects of failure of the managed device to achieve the expected state responsive to the verification component failing to verify that the current state of the managed device matches the expected state.

2. The system according to claim 1, wherein the verification component is further configured to verify the current state of the managed device reported by the managed device.

3. The system according to claim 1, wherein the profile component is further configured to define expected states for the managed device associated with a plurality of operating states and a plurality of transitions between the operating states.

4. The system according to claim 3, wherein the verification component is further configured to evaluate the current state of the managed device to determine if the managed device's characteristics match the expected state based on the control command and a previous operating state of the managed device.

5. The system according to claim 1, wherein the verification component is further configured to execute actions on the managed device responsive to evaluation of the current state.

6. The system according to claim 5, wherein the actions executed by the verification component include at least one of re-executing the control command, powering down the managed device, powering down an upstream device, and generating an alarm.

7. The system according to claim 1, wherein the monitoring component is configured to receive and process video data on the managed device; and communicate the processed video data to the verification component.

8. The system according to claim 1, further comprising a behavior component configured to:

track device properties of the managed device under operation; and
generate a device profile for the managed device.

9. The system according to claim 8, wherein the behavior component is further configured to generate the device profile and device properties for a plurality of operating states of the managed device.

10. The system according to claim 8, wherein the behavior component is further configured to generate the device profile and device properties by updating an existing device profile and existing device characteristics.

11. A method for verification of management operations, the method comprising:
    identifying, by a computer system, a control command for execution on a managed device;
    accessing, by the computer system, monitor information associated with the managed device responsive to identification of the control command;
    determining, by the computer system, an expected state of a managed device based on the identified control command; and
    verifying, by the computer system, a current state of the managed device matches the expected state based on the monitor information by performing a secondary confirmation of a successful completion of the control command by the managed device, performing the secondary confirmation including analyzing the monitor information to determine if an actual state of the managed device matches the expected state, the secondary confirmation performed in addition to receiving acknowledgement of successful completion of the control command by the managed device; and
    executing one or more control functions to mitigate undesirable effects of failure of the managed device to achieve the expected state responsive to the verification component failing to verify that the current state of the managed device matches the expected state.

12. The method according to claim 11, wherein the act of verifying includes verifying the current state of the managed device reported by the managed device.

13. The method according to claim 11, further comprising defining, by the computer system, expected states for the managed device associated with a plurality of operating states and a plurality of transitions between the operating states.

14. The method according to claim 13, wherein the act of verifying includes verifying the current state of the managed device to determine if the managed device's characteristics match the expected state based on the control command and a previous operating state of the managed device.

15. The method according to claim 1, further comprising automatically executing, by the computer system, actions on the managed device responsive to evaluation of the current state.

16. The method according to claim 15, wherein the act of automatically executing includes at least one of re-executing the control command, powering down the managed device, powering down an upstream device, and generating an alarm.

17. The method according to claim 1, further comprising:
    processing, by the computer system, video data on the managed device; and
    communicating the processed video data to the verification component.

18. The method according to claim 1, further comprising:
    tracking, by the computer system, device properties of the managed device under operation; and generating, by the computer system, a device profile for the managed device.

19. The method according to claim 18, wherein generating the device profile includes generating the device profile and device properties for a plurality of operating states of the managed device.

20. The method according to claim 18, wherein generating the device profile for the managed device includes updating an existing device profile and device characteristics.

21. The system according to claim 1, wherein the monitoring component is configured to collect the monitoring information from a plurality of sources and the verification component is configured to randomly select a subset of the monitoring information to use to verify the current state of the managed device.

22. The system of claim 1, wherein the one or more control functions include one or more of executing a control command on an alternate device to effect a control command that was not properly executed on the managed device, terminating power to the managed device, or preventing access of personnel to a location including the managed device.

* * * * *